United States Patent
Ochiai et al.

[15] 3,662,552
[45] May 16, 1972

[54] MASTER CYLINDER FOR HYDRAULIC BRAKING SYSTEM

[72] Inventors: Chiaki Ochiai, Kariya City; Takashi Fuji, Toyota City, both of Japan

[73] Assignee: Aisin Seiki Kabushiki Kaisha, Kariya City, Oichi Pref., Japan

[22] Filed: Oct. 12, 1970

[21] Appl. No.: 79,757

[30] Foreign Application Priority Data

Oct. 18, 1969 Japan..................................44/83507

[52] U.S. Cl..................................................60/54.6 E
[51] Int. Cl.......................................................F15b 7/00
[58] Field of Search..............................60/54.5 E, 54.6 E

[56] References Cited

UNITED STATES PATENTS

| | | | |
|---|---|---|---|
| 3,117,421 | 1/1964 | Stelzer | 60/54.6 E |
| 3,143,860 | 8/1964 | Stelzer | 60/54.6 E |
| 3,486,337 | 12/1969 | Tenniswood | 60/54.6 E |
| 3,488,959 | 1/1970 | Tenniswood | 60/54.6 E |
| 3,412,556 | 11/1968 | Rihe et al. | 60/54.6 E |

Primary Examiner—Edgar W. Geoghegan
Assistant Examiner—A. M. Zupcic
Attorney—Pierce, Scheffler & Parker

[57] ABSTRACT

A master cylinder for hydraulic braking system of an automotive vehicle comprising a hydraulic piston slidably fitted in the cylinder bore, a valve member operatively connected to the piston and normally spaced from a reservoir inlet of the master cylinder for controlling fluid communication therethrough, a stopper bolt normally spaced from the piston for limiting the most retracted position thereof. When residual hydraulic pressure remains within the master cylinder after the brake has been released, the piston is immediately shifted to its most retracted position due to residual pressure whereby any residual hydraulic pressure is released to the reservoir.

2 Claims, 2 Drawing Figures

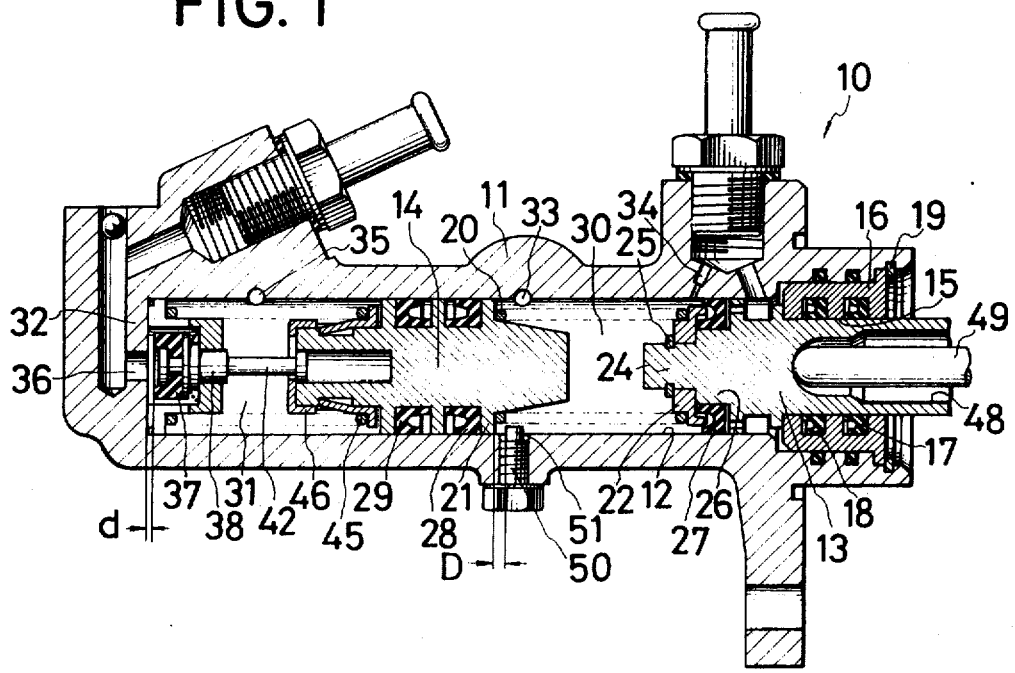

MASTER CYLINDER FOR HYDRAULIC BRAKING SYSTEM

This invention relates to a master cylinder for use in the hydraulic braking system of a powered vehicle, for example a motor vehicle.

Conventionally, the master cylinder comprises the hydraulic piston slidingly fitted within the master cylinder housing, the hydraulic chamber being constituted in the cylinder housing, a stopper bolt for defining the retracted position of the hydraulic piston, an elastic valve member operatively connected to the hydraulic piston for controlling fluid communication between the oil reservoir and the wheel braking system via the hydraulic chamber of the master cylinder, an inlet port provided in the master cylinder housing for permitting the braking fluid to flow therethrough from the oil reservoir to the hydraulic chamber, said valve member being axially separated from the inlet port by a suitable distance ($d$) when the brake is released.

This construction is not desirable because the residual hydraulic pressure within the hydraulic chamber will result in axially stretching the elastic valve member as much as the distance $d$ to keep the inlet port sealed even after the brake pedal has been released. The said residual hydraulic pressure is likely to exist within the hydraulic chamber of the master cylinder under the following conditions:

1. When repeated braking operations are made causing excessive fluid to flow from the reservoir into the hydraulic chamber.
2. When vapor lock of the braking fluid occurs due to the frequently repeated braking operation which will cause the brake drum and the like to heat up, resulting in increasing the volume of said braking fluid.
3. When using a the mechanical brake, together with the hydraulic brake, the volume of braking fluid within wheel cylinder is increased by moving the piston of the wheel cylinder. When the mechanical brake is released, it causes excessive braking fluid to remain in the hydraulic chamber of the master cylinder since the simultaneously released pedal brake will convey back to the oil reservoir only that braking fluid which was limited by the preceding brake pedal stroke.

When residual hydraulic pressure is locked within the hydraulic chamber of the master cylinder even after the brake pedal has been released, the valve member made from a resilient material is stretched so that the port through which hydraulic pressure is to be conveyed back to the oil reservoir from the wheel braking system and master cylinder chamber is kept closed. As a result, a braking force due to the said residual hydraulic pressure is applied to the wheel braking system even after the foot-operated brake has been fully released.

In order to overcome the above drawbacks, there has been proposed a master cylinder structure in which the valve member is considerably separated from the compensating port in the master cylinder housing so as to be spaced therefrom even when residual hydraulic pressure is applied to the valve member.

Such an arrangement, however, presented new problems. The greater the distance is between the said inlet port of the master cylinder housing and the valve member, the longer the brake pedal stroke required upon application of the brakes. Consequently, there is required of the longer stroke a brake pedal or a longer time to generate the increased hydraulic pressure in the master cylinder so as to accomplish braking.

Therefore, the principal object of the invention is to provide a new and improved master cylinder for a hydraulic braking system in which no residual hydraulic pressure remains within the master cylinder after the brakes have been released.

Another object of the invention is to provide a master cylinder for a hydraulic braking system in which the brake pedal stroke for applying the brakes is not elongated.

A further object of the invention is to provide a master cylinder for a hydraulic braking system which is simple in construction and economical to manufacture.

The master cylinder according to the present invention comprises a hydraulic piston means slidably fitted in a master cylinder bore and provided with a shoulder, hydraulic chamber means provided in the cylinder bore, a valve member operatively connected to said piston means for controlling fluid communication between an oil reservoir, and a wheel braking system via a port in the master cylinder bore, and stopper means normally spaced from the shoulder of said piston means by a suitable distance, the retracted position of said piston means being normally defined by a valve rod connected to said valve member at its one end and to said piston means at its other end, the most retracted position of said piston means being defined by said stopper means when residual hydraulic pressure remains within said hydraulic chamber means.

In order to afford a clearer understanding of this invention a specific embodiment thereof will now be described with reference to the attached drawings, in which:

FIG. 1 is a sectional view of the master cylinder taken through the center of the master cylinder in its retracted or brake released position; and FIG. 2 is a fragmentary enlarged sectional view of FIG. 1 showing the master cylinder in its most retracted position due to the residual hydraulic pressure.

Referring to the drawings, the tandem master cylinder 10 comprises a cylinder housing 11 and a cylinder bore 12 within which a first piston 13 and a second piston 14 are slidingly and sealingly fitted. The first piston 13 is slidable through an opening 15 in a closure member 16 which closes the open end of the cylinder bore 12, there being two seals 17 and 18 to prevent fluid leakage through the opening 15 and across the outer diameter of the closure 16. A snap ring 19 fitted within the slot of the housing 11 defines the retracted position of the first piston 13. A coil spring 20 is compressed between a shoulder 21 formed integrally with the second piston 14 and a collar spring retainer 22 held at the most reduced diameter portion 24 of the first piston 23 by a snap ring 25. At the reduced diameter portion 26 of the first piston 13, there is securely attached a sealing cup 27.

The second piston 14 is sealed by two seals 28 and 29 whereby there is provided a primary hydraulic chamber 30 between the first and second pistons, while there is also provided a secondary hydraulic chamber 31 between the second piston 14 and an end wall 32 of the housing 11. The primary chamber 30 is connected via an outlet port 33 to one wheel braking system via a compensating port 34 to a primary oil reservoir (not shown). The secondary chamber 31 is connected via an outlet port 35 to the other wheel braking system and via a compensating port 36 to a secondary oil reservoir (not shown). The end wall 32 of the cylinder housing is apertured to form the said compensating port 36.

An on-off control valve 37 made from a rubberlike material and adapted for cooperation with the compensating port 36 is normally spaced from the end wall 32 by a distance $d$ in the conventional way and is fixed on a carrier member 38 which passes slidably through a guide opening 39 formed in a valve guiding member or valve casing 40, said valve casing 40 being shaped into a flanged cup and formed with a plurality of radial grooves 41 which serve as oil passage means for hydraulically connecting the compensating port 36 to the secondary hydraulic chamber 31. The carrier 38 is formed integrally with an axially extending rod 42 which, together with the carrier 38, is urged resiliently leftward by a spiral spring 23 interposed between the valve casing 40 and the valve carrier 38 and is provided with an enlarged end 43 slidably fitted with in a blind bore 44 of the second piston 14.

A return spring 45 is kept in precompressed state between the valve casing 40 and a cup-shaped retainer 46, said retainer being securely mounted on the left end of the second piston 14 and provided at its head portion with a guitar-shaped opening 47 to receive the axial rod 42. It will be seen that the rod 42 passes slidably through the opening 47 of the retainer 46 but the enlarged end 43 is checked thereby to prevent the rod from slipping out of the blind bore 44. It should be further noted that the return spring 45 has a spring strength equal to or stronger than the coil spring 20, but the retracted position of the second piston 14 is normally defined by the valve rod 42 engaged with the cup retainer 46.

The right hand end of the first piston 13 is formed with a deep axial recess 48 the apex of which is kept in pressure contact with the inner end of a push rod 49, said rod being mechanically connected to a conventional foot-operated brake pedal (not shown).

A stopper bolt 50 is screwed in the cylinder housing 11 and projected into the primary hydraulic chamber 30 at 51. The projection 51 is spaced from the shoulder 21 of the second piston 14 by distance D when the master cylinder is assembled or when no residual hydraulic pressure remaining in the secondary chamber 31, said projection being adapted for engagement with the shoulder 21 thereby defining the most retracted position of the second piston 14 due to residual hydraulic pressure within the secondary chamber 31.

In operation, when the operator depresses the foot-brake pedal so as to move the push rod 49 in the left direction in FIG. 1, the first hydraulic piston 13 is also moved to the left against the action of the spring 20 so that the compensating port 34 is blocked by the sealing cup 27. Thus the hitherto established hydraulic connection between the primary reservoir and primary hydraulic chamber is interrupted, the hydraulic pressure prevailing therein being suddenly increased. This increased hydraulic pressure is then conveyed from the chamber 30 through the outlet 33 to one of the wheel braking systems. The second piston is also moved to the left against the action of the return spring 45 due to the increased hydraulic pressure in the primary chamber and the exerting force of the coil spring 20. With the movement to the left of the second piston 14, the retainer 46 carried thereby will perform the same amount of axial movement as the piston, thus the pressure contact between the cup-shaped retainer 46 and the enlarged end 43 of the rod is released. Therefore, the valve member 37 is moved to the left by the conical spring 23 so that the hitherto established communication between the secondary oil reservoir and secondary chamber is interrupted. The hydraulic pressure in the secondary chamber 31 is thus increased and conveyed to the other wheel braking system through the outlet port 35.

When the operator releases his foot pressure from the brake pedal, the first and second pistons are returned rapidly from their brake actuating positions to their original starting positions under the returning action of the coil springs 20 and 45, respectively. When the first piston 13 is brought into its original starting position the fluid communication between the primary reservoir and primary chamber is reestablished since the sealing cup 27 is moved from the compensating port 34 to the right together with the first piston, thus the pressurized fluid is conveyed back to the primary reservoir via port 33, the primary hydraulic chamber 30, and the compensating port 34.

In the similar way, when the second piston is brought into its original starting position the fluid communication between the secondary reservoir and secondary chamber is reestablished since the axial rod 42 integral with the valve carrier 38 is moved to the right together with the cup-shaped retainer 46, thus the pressurized fluid is conveyed back to the secondary reservoir via the port 35, the secondary chamber 31, and the compensating port 36.

When hydraulic pressure remains as residual hydraulic pressure within the secondary chamber 31 even after the brake pedal has been released, for instance, after repeated braking operations have been made, the second piston will be moved to the right a distance D until it engages with the projection 51 of the stopper bolt 50 as is shown in FIG. 2, causing the rod 42 to move to the right. The valve member 37 is thus separated from the end wall 32 of the cylinder housing by the distance $d$ plus D whereby objectionable residual hydraulic pressure causing the valve member to axially stretch is not applied.

Although a tandem master cylinder is described as an embodiment of this invention, it should be recognized that the invention is also applicable to a master cylinder having a single hydraulic piston.

What we claim is:

1. A master cylinder for a hydraulic braking system comprising a cylinder housing provided with a bore, piston means slidably and sealingly mounted within said bore and provided with a circumferential shoulder at one end thereof, said piston means and cylinder housing forming a hydraulic chamber which communicates with a wheel brake system, port means provided in the end wall of said cylinder housing and communicating with a reservoir, a valve member composed of an elastic material operatively connected to the other end of and having a smaller cross-sectional area than said piston means for controlling communication through said port means, said valve member being normally axially spaced from said port means when the brakes are released and there is no residual hydraulic pressure within said hydraulic chamber, a fixed abutment stopper means provided in the bore of said cylinder housing normally spaced an axial distance from and adjacent the shoulder of said piston means when in the normally released piston, said stopper means cooperating with the shoulder to limit additional axial movement of said piston means and valve member caused by possible residual hydraulic pressure remaining in said hydraulic chamber when the brakes are released, to ensure opening of said port means by said valve member to release the residual hydraulic pressure to the reservoir.

2. A master cylinder as claimed in claim 1 and further comprising a valve carrier for supporting said valve member and an axial rod secured at one end to said valve carrier, its other end being slidably received in said piston means and movable therewith when said piston means is moved axially by residual hydraulic pressure toward said stopper means.

* * * * *

UNITED STATES PATENT OFFICE
CERTIFICATE OF CORRECTION

Patent No. 3,662,552  Dated May 16, 1971

Inventor(s) CHIAKI OCHIAI and TAKASHI FUJII

It is certified that error appears in the above-identified patent and that said Letters Patent are hereby corrected as shown below:

Claim 1, line 18, - the word "piston"

should be:

--- position ---

The last name of the second inventor is incorrectly spelled "Fuji". It should be "FUJII"

Signed and sealed this 25th day of July 1972.

(SEAL)
Attest:

EDWARD M. FLETCHER, JR.       ROBERT GOTTSCHALK
Attesting Officer             Commissioner of Patents